US009160711B1

(12) United States Patent
Sweet et al.

(10) Patent No.: US 9,160,711 B1
(45) Date of Patent: Oct. 13, 2015

(54) INTERNET CLEANING AND EDGE DELIVERY

(71) Applicant: Bank of America Corporation, Charlotte, NC (US)

(72) Inventors: Patrick Sweet, Albany, NY (US); Andrew Smith, Anamosa, IA (US); Gregory Moore, Rockwall, TX (US); Charles Wheeler, Kansas City, MO (US); Chris Cummins, Denver, CO (US); James Monroe, Simi Valley, CA (US); Timothy Byrd, Charlotte, NC (US); Daniel Gapastione, Lewisville, NC (US); Michael Stark, Sherborn, MA (US); Craig A. Froelich, Thousand Oaks, CA (US)

(73) Assignee: Bank of America Corporation, Charlotte, NC (US)

( * ) Notice: Subject to any disclaimer, the term of this patent is extended or adjusted under 35 U.S.C. 154(b) by 73 days.

(21) Appl. No.: 13/915,292

(22) Filed: Jun. 11, 2013

(51) Int. Cl.
*H04L 29/00* (2006.01)
*H04L 29/06* (2006.01)

(52) U.S. Cl.
CPC .................................. *H04L 63/0245* (2013.01)

(58) Field of Classification Search
USPC ................. 235/379; 726/26; 705/38
See application file for complete search history.

(56) References Cited

U.S. PATENT DOCUMENTS

| | | | |
|---|---|---|---|
| 7,676,841 B2 | 3/2010 | Sobchuk et al. | |
| 2006/0006222 A1* | 1/2006 | Brey et al. | 235/379 |
| 2010/0275265 A1* | 10/2010 | Fiske et al. | 726/26 |
| 2012/0291125 A1 | 11/2012 | Maria | |
| 2013/0024358 A1* | 1/2013 | Choudhuri et al. | 705/38 |
| 2014/0257917 A1 | 9/2014 | Spencer et al. | |

* cited by examiner

*Primary Examiner* — Michael D Anderson
(74) *Attorney, Agent, or Firm* — Banner & Witcoff, Ltd.; Michael A. Springs

(57) ABSTRACT

Methods, systems, and computer-readable media for implementing a cleansing farm are presented. A cleansing farm may comprise of a computing device that filters customer requests directed to an organization before they are routed internal to the organization. A cleansing farm may receive customer requests and filter the requests based on a set of filtering rules. The cleansing farm may inspect the customer request in order to determine whether it should be filtered. In an example where the organization is a financial institution, the customer request may include confidential customer information. Accordingly, in this example, the cleansing farm may be administered by an entity that is permitted to access the confidential customer information. A visualization tool may be used to visualize a plurality of customer requests at a cleansing farm and to generate rules for filtering customer requests at a cleansing farm.

20 Claims, 8 Drawing Sheets

US 9,160,711 B1

INTERNET CLEANING AND EDGE DELIVERY

BACKGROUND

Aspects of the disclosure relate to computer hardware and software. In particular, one or more aspects of the disclosure generally relate to computer hardware and software that can be used to provide an Internet edge cleansing farm.

Cyber attacks have become more prevalent and have had increasingly negative consequences over today's modern Internet network. Organizations that service customer requests over the Internet at a large scale are candidates for cyber attackers of the modern age. In particular, denial of service attacks are readily used and cyber attackers have found some success with this strategy. Mitigation tactics have been used to deter cyber attackers from implementing denial of service attacks. However, at times, confidential information is passed between organizations and customers. Accordingly, there is a need to mitigate against cyber attacks when confidential information may be involved in the communications between organizations and customers. In addition, cyber attackers are highly agile and adapt well. Accordingly, there is also a need for an adaptable mitigation strategy against cyber attacks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure provide various techniques that enable a cleansing farm to filter customer requests and mitigate against cyber attacks on an organization.

Methods, systems, and computer-readable media for implementing a cleansing farm are presented. A cleansing farm may include a computing device that filters customer requests directed to an organization before they are routed internal to the organization. A cleansing farm may receive customer requests and filter the requests based on a set of filtering rules. The cleansing farm may inspect the customer request in order to determine whether it should be filtered. In an example where the organization is a financial institution, the customer request may include confidential customer information. Accordingly, in this example, the cleansing farm may be administered by an entity that is permitted to access the confidential customer information.

In an embodiment, cleansing farms may be located at the entry point of an internal network or may be implemented across a cloud within an internal network. The cleansing farm may filter customer requests and then route customer requests to a destination within the internal network. For example, a customer request may be routed using a content delivery network, a domain name system, or based on any other suitable internal network.

In an embodiment, a cleansing farm my perform packet inspection across a variety of layers of a customer request. For example, packet inspection may be done over one or more, including all, of the layers of the Open Systems Interconnection (OSI) communication model for a customer request. In an embodiment, rules for mitigating against a layer 4, or transport layer, denial of service attack, a layer 7, or application layer, denial of servicer attack, or a denial of service attack focusing on other layers may be implemented. In an embodiment, deep packet inspection (DPI) may be implemented within a cleansing farm.

In an embodiment, a visualization tool may be used to visualize a plurality of customer requests at a cleansing farm. For example, the visualization tool may display customer requests received at a single cleansing farm, or received at an aggregate of a plurality of cleansing farms. The visualization tool may also display parameters associated with the customer requests. In an embodiment, the visualization tool may be used to generate a rule for filtering customer requests received at one or more cleansing farms.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to an Internet edge cleansing farm. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
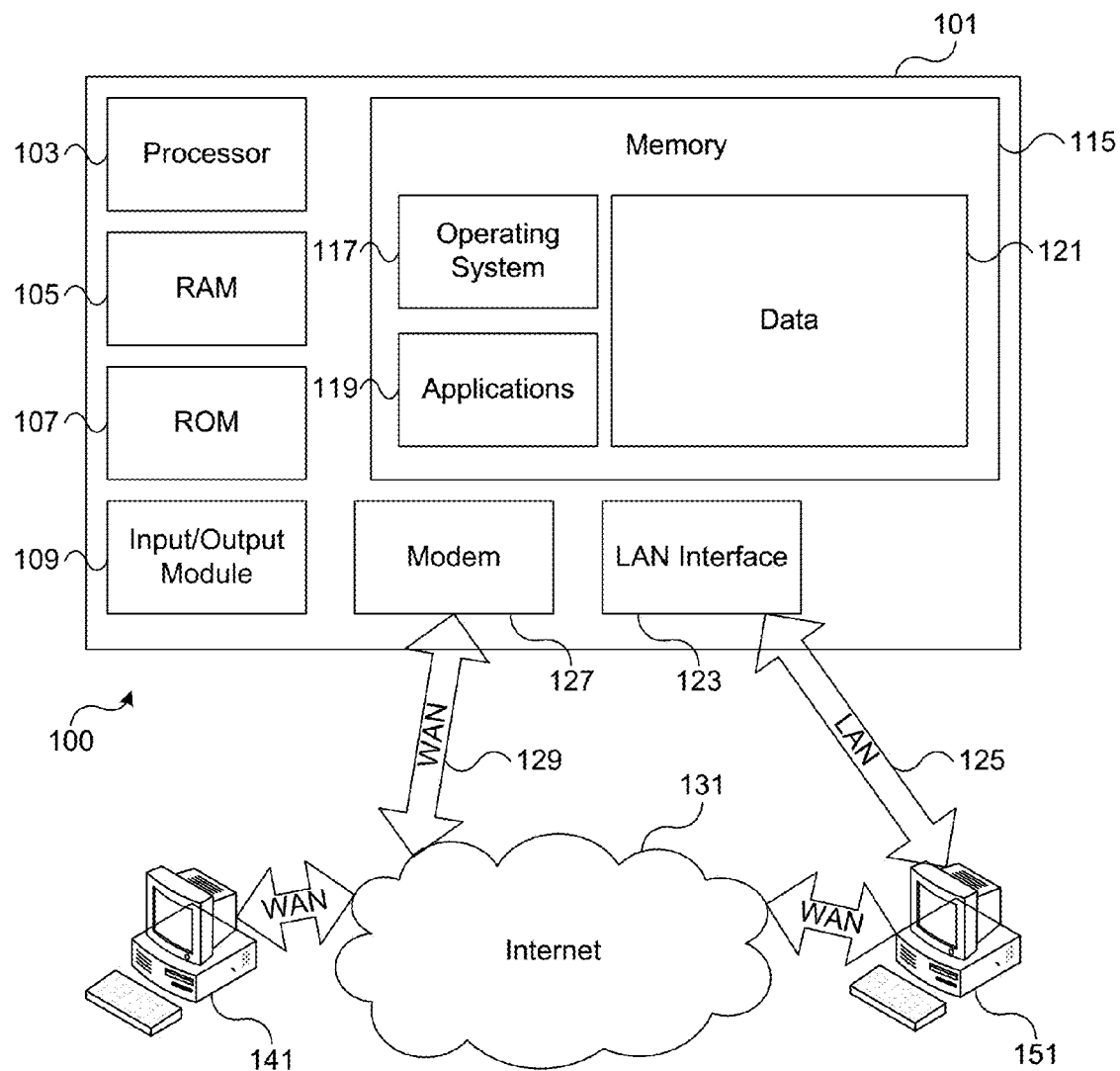
FIG. 1A illustrates an example operating environment according to an embodiment.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
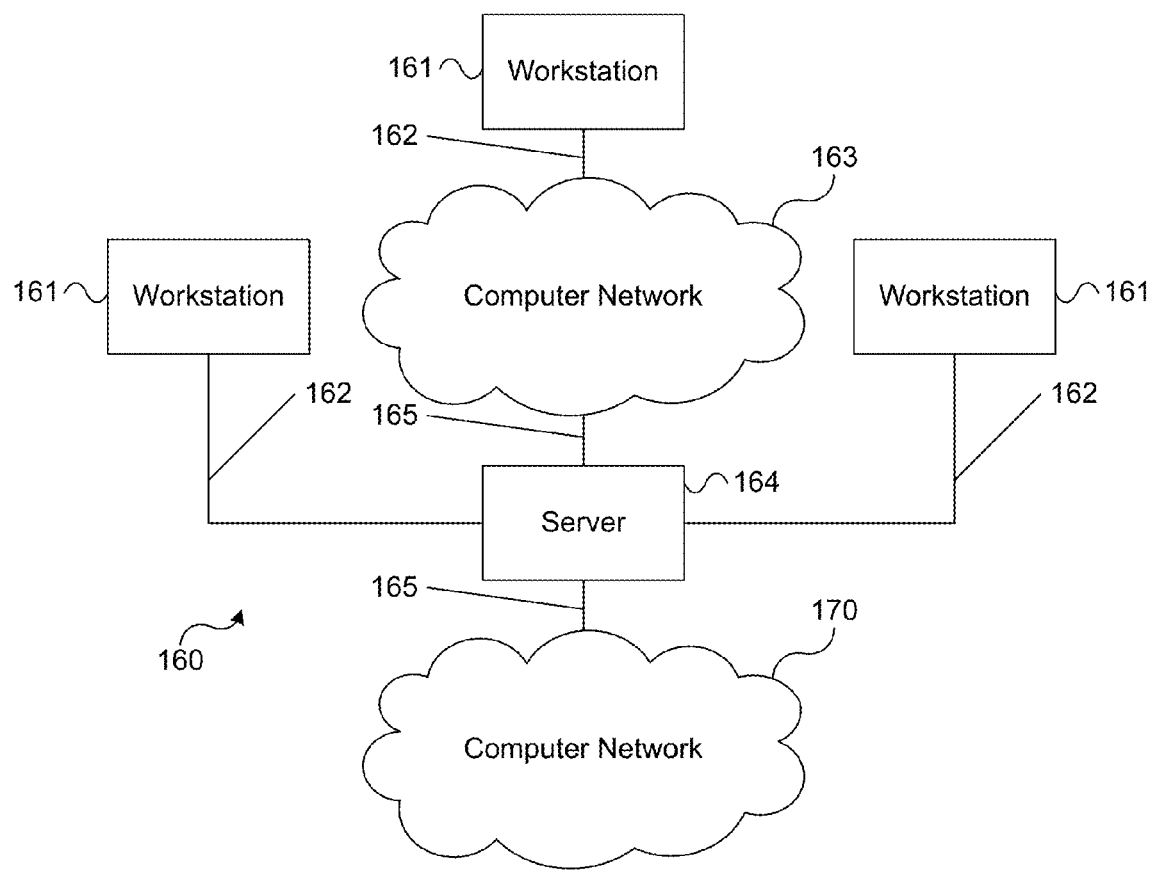
FIG. 1B illustrates another example operating environment according to an embodiment.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170. In an embodiment, workstations 161 may comprise a mobile device, such as a cellular phone, a smart phone, a personal digital assistant (PDA), a tablet, a laptop, or any other suitable mobile device.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

In an embodiment, an organization, such as a bank or a financial institution, may service customer requests from an outside source. For example, a bank may service customer requests generated at an outside computing device and routed to a bank computing device through the Internet. These requests may include customer requests to electronically manage a customer account with the bank. In some examples, the organization may service a large number of customer requests and may receive these requests from a large number of outside computing devices. In these instances, the organization may be a candidate for various types of cyber attacks.

For instance, the organization may be candidate for a distributed denial of service attack (DDoS) or a denial of service attack (DoS). In such an attack, a magnitude of customer requests are generated from multiple outside computing devices where the requests are designed to disrupt the organization's business operations. For example, in an HTTP DDoS or DoS attack, the magnitude of customer requests may be a plurality of HTTP GET requests. If the attack includes a large enough number of such requests, the computing devices at the organization responsible for servicing such requests may become overloaded. In this example, the organization might not be able to service legitimate requests because the organization's computing devices are busy servicing the requests from the DDoS or DoS attack or because the requests from the DDoS or DoS attack overloaded these computing devices to the point of failure.

Figure 2:
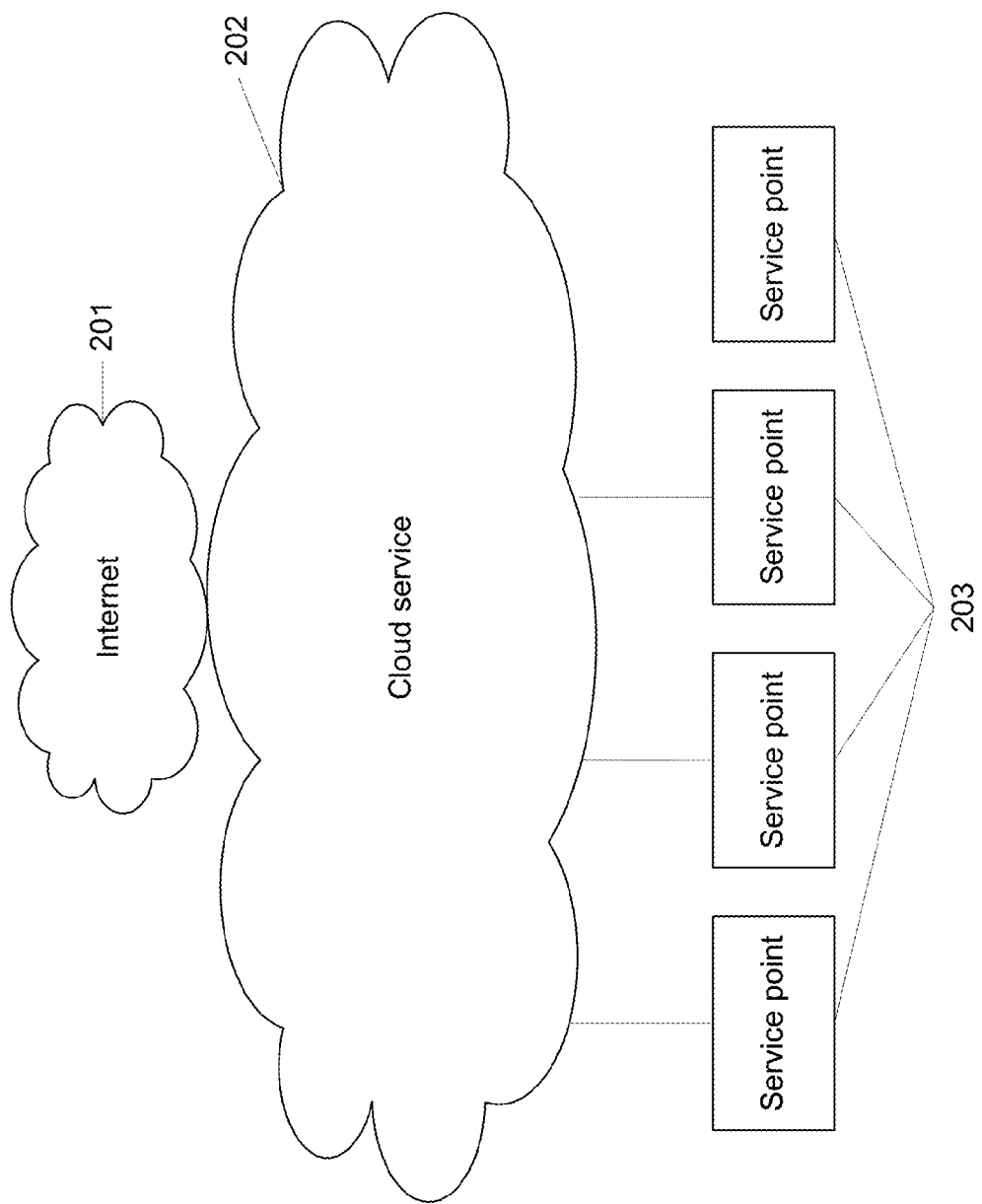
FIG. 2 illustrates an example network architecture that implements cleansing farms in a cloud according to an embodiment.

In an embodiment, cleansing farms may be used to filter customer malicious requests, e.g., that are determined to be part of a cyber attack, such as a DDoS or DoS attack. An example network architecture using a cleansing farm according to an embodiment is illustrated in FIG. 2. FIG. 2 includes Internet 201, cloud service 202, and service points 203. In an embodiment, an organization, such as a bank, may deploy cloud service 202 and service points 203. For example, a customer request for an organization may be received at cloud service 202 from Internet 201, and the customer request may be routed to one or more service points 203. Service points 203 may comprise a data center, a software service, a network, an intranet, or any other suitable service. A software service may be hosting a web service that allows customers to access and/or update organizational data, such as a web service that allows customers to manage financial accounts at a banking institution. In an embodiment, cloud service 202 and service points 203 represent an internal network within the organization.

In an embodiment, cloud service 202 includes one or more cleansing farms that are used to filter received customer requests. In such an example, the one or more cleansing farms may be distributed across the cloud and may be implemented in any suitable manner. Cleansing farms will be described in more detail below with reference to FIGS. 5 and 6 below.

Figure 3:
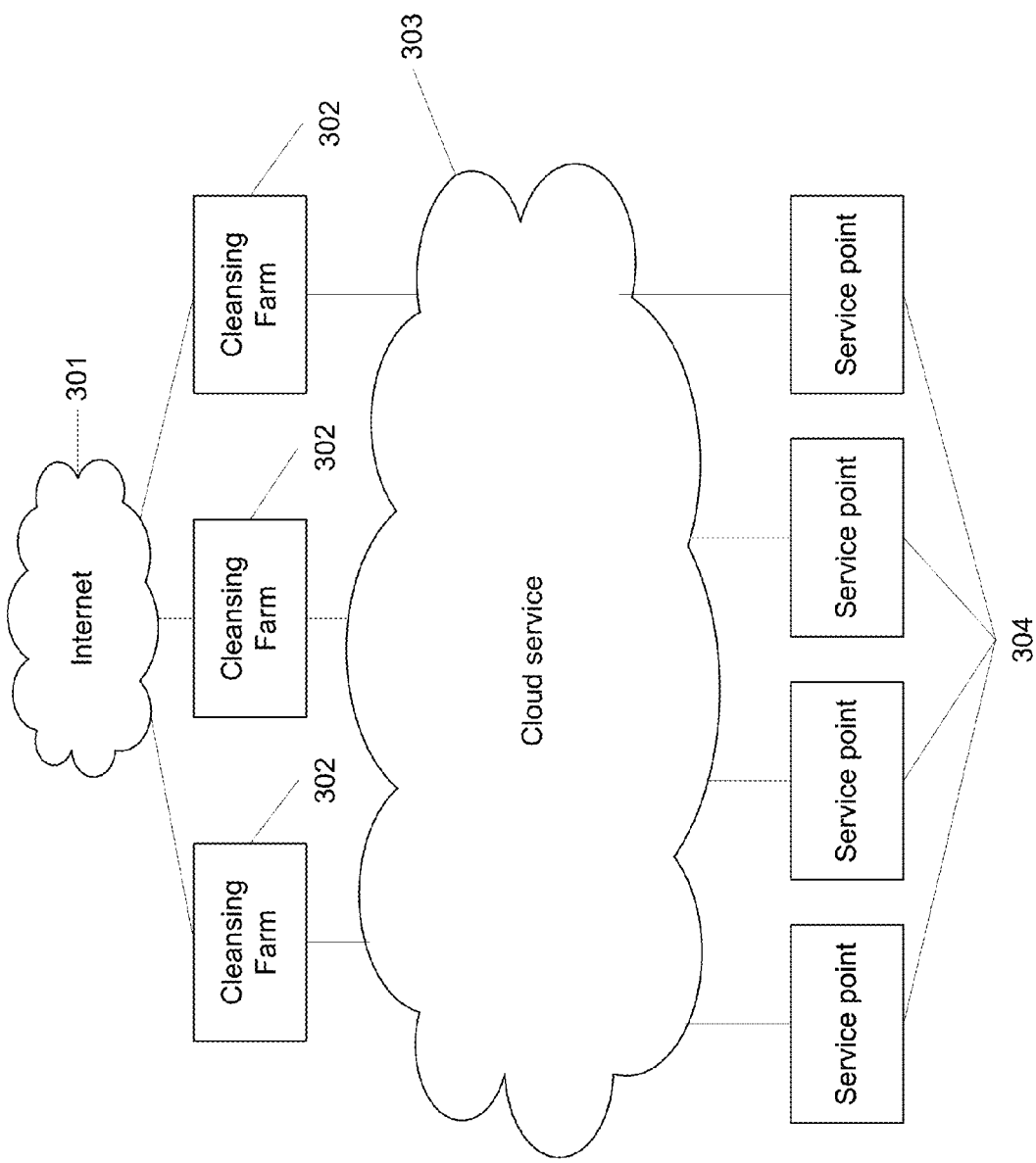
FIG. 3 illustrates an example network architecture that implements cleansing farms according to an embodiment.

FIG. 3 illustrates an alternative embodiment of an example network architecture implementing a cleansing farm. FIG. 3 includes Internet 301, cleansing farms 302, cloud service 303, and service points 304. FIG. 3 may be implemented in a similar fashion to FIG. 2, or in any other suitable manner. In an embodiment, cloud service 303 is connected to Internet 301 by cleansing farms 302. For example, a customer request for an organization may be received at one of cleansing farms 302 from Internet 301, and the customer request may be forwarded to cloud service 303. From cloud service 303 the customer request may be further routed to one or more service points 304. Service points 304 may be similar to service points 203 of FIG. 2. In an embodiment, cleansing farms 302, cloud service 303 and service points 304 represent an internal network within the organization.

Figure 4:
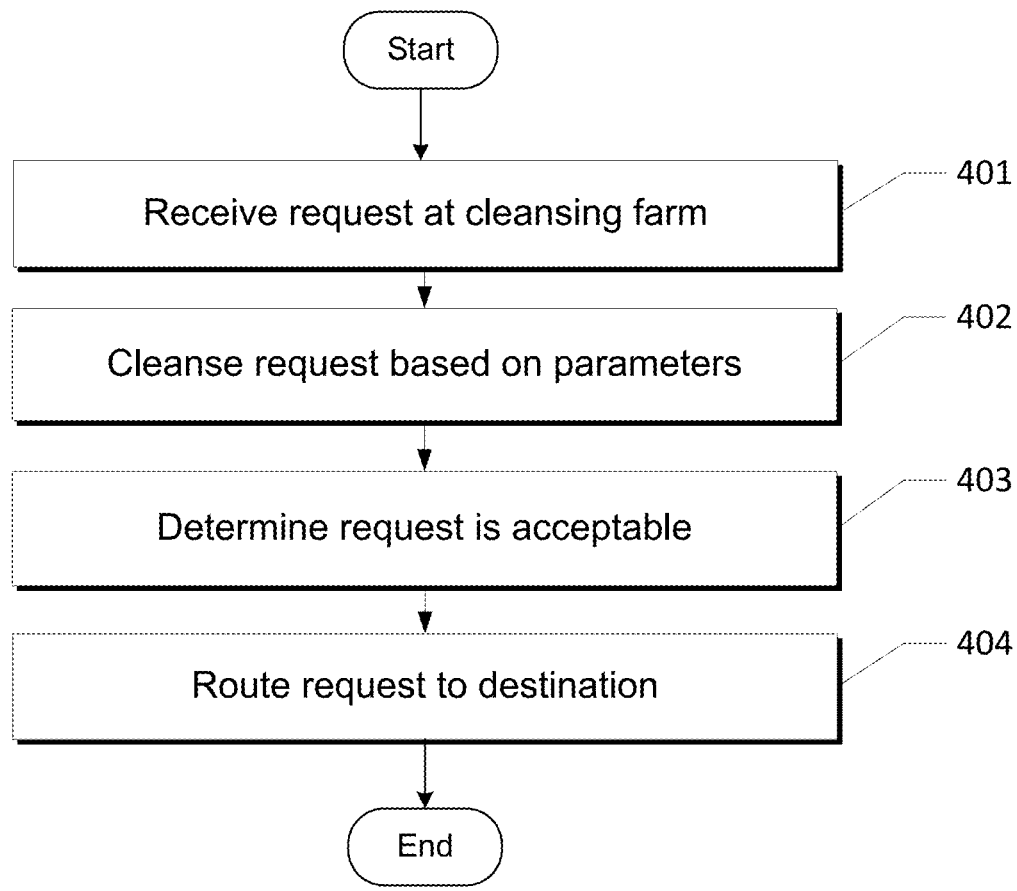
FIG. 4 illustrates an example process for routing a customer request using a cleansing farm according to an embodiment.

FIG. 4 illustrates an example process for routing customer requests according to an embodiment. The process of FIG. 4 may be implemented in a network architecture similar to those illustrated in FIGS. 2 and 3, or in any other suitable architecture. The process of FIG. 4 may begin at step 401, where a request is received at a cleansing farm. For example, a customer request for an organization, such as a bank, may be received at a cleansing farm. In an embodiment, the customer request may be received at a cloud, such as cloud service 202 in FIG. 2, and the customer request may be routed to a cleansing farm implemented within the cloud. In another embodiment, the customer request may be received at a cleansing farm, such as one of cleansing farms 302 of FIG. 3, prior to being forwarded to a cloud service, such as cloud service 303 of FIG. 3.

The process of FIG. 4 may proceed from step 401 to step 402, where a customer request is cleansed based on one or more parameters. In an embodiment, the customer request may be analyzed to determine one or more parameters for the request, such as an address block, an IP address, a request type, and the like. Cleansing a customer request may comprise filtering the request based on a result of an analysis of the parameters for the request. In an embodiment, a cleansing farm may be configured to perform step 402 in an automated manner. Cleansing a customer request will be described in more detail below with reference to FIGS. 5 and 6. The process of FIG. 4 may proceed from step 402 to step 403, where a customer request is determined to be acceptable. For example, a customer request may be analyzed by the cleansing farm and may further be determined to be an acceptable request. An acceptable customer request may be a request that is determined not to be malicious or a request that is determined not to be a part of a cyber attack, such as a DDoS or DoS attack. In an embodiment, a cleansing farm may be configured to perform step 403 in an automated manner. Cleansing a customer request will be described in more detail below with reference to FIGS. 5 and 6.

The process of FIG. 4 may proceed from step 403 to step 404, where a request is routed to a destination. In an example according to FIG. 2, the request may be received at cloud service 202 and routed to a destination comprising one or more of service points 203. In an example according to FIG. 3, the request may be received at one of cleansing farms 302 and may be forwarded to cloud service 303. From cloud service 303, the request may be routed to a destination comprising one or more service points 304.

In an embodiment, the request may be routed to a destination based on a domain name system that is part of an organization. For example, a domain name server may be queried such that an IP address for a destination of the request may be looked up. The request may then be routed to the destination IP address within the organization. The domain name system may be implemented within a cloud service for the organization, such as cloud service 202 of FIG. 2 or cloud service 303 of FIG. 3. In another example, the domain name system may be implemented by one or more service points, such as service points 203 of FIG. 2 or service points 304 of FIG. 3.

In an embodiment, the request may be routed to a destination based on a content delivery network that is part of an organization. For example, a customer request may be a request for content, such as an HTTP GET request for a web page or other resource, and the request may be forwarded from the cleansing farm to a content delivery network. The content delivery network may include a server capable of fulfilling the customer request, such as a web service capable of fulfilling an HTTP GET request. The content delivery network may be implemented within a cloud service for the organization, such as cloud service 202 of FIG. 2 or cloud service 303 of FIG. 3. In another example, the content delivery network may be implemented by one or more service points, such as service points 203 of FIG. 2 or service points 304 of FIG. 3. In an embodiment, the content delivery network may also be implemented as a software service provided by a third party vendor.

Figure 5:
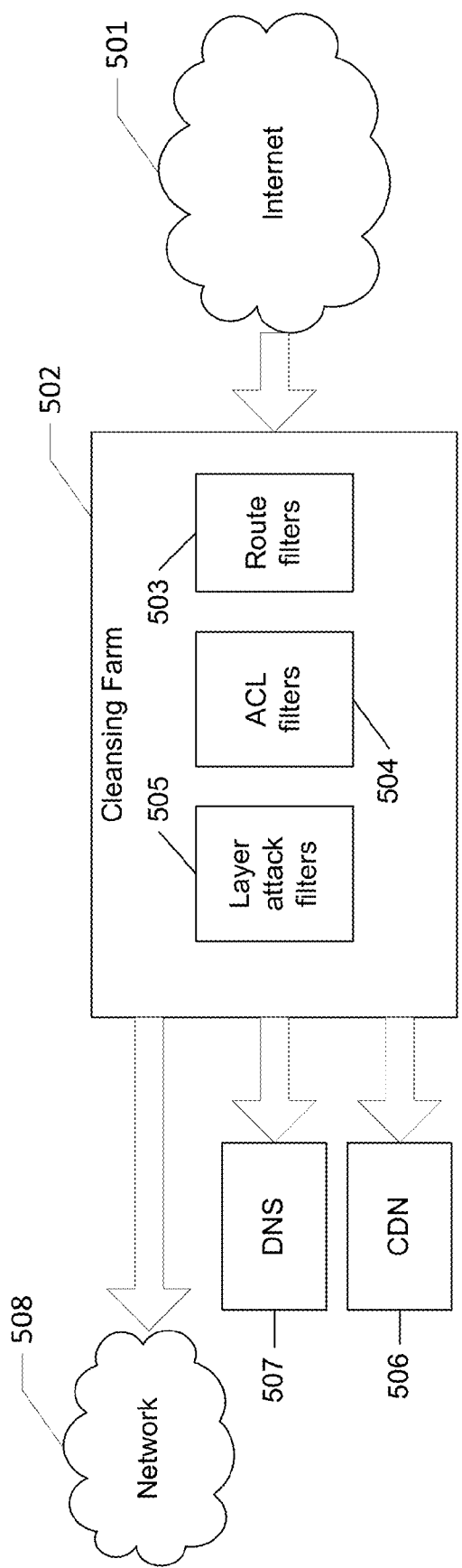
FIG. 5 illustrates an example system for filtering customer requests using a cleansing farm according to an embodiment.

FIG. 5 illustrates a cleansing farm according to an embodiment. FIG. 5 includes Internet 501, cleansing farm 502, route filters 503, ACL filters 504, layer attack filters 505, content domain network 506, domain name system 507, and network 508. In an embodiment, cleansing farm 502 may be implemented by cleansing farms 302 of FIG. 3 or may be implemented within cloud service 202 of FIG. 2. By way of example, a customer request may be transmitted from Internet 501 and may be received at cleansing farm 502. Cleansing farm 502 of FIG. 5 may perform the process of FIG. 6.

Figure 6:
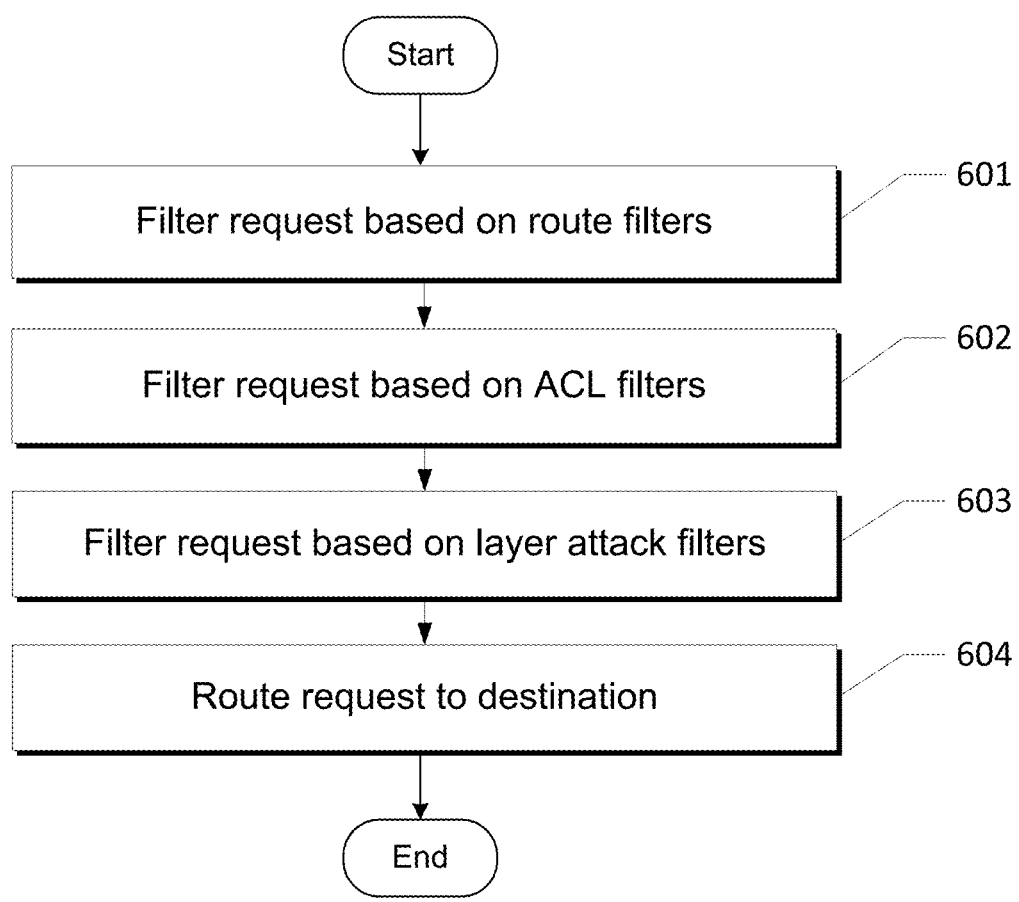
FIG. 6 illustrates an example process for filtering customer requests using a cleansing farm according to an embodiment.

FIG. 6 illustrates a process of cleansing a customer request at a cleansing farm according to an embodiment. By way of example, steps 402 and 403 of FIG. 4 may further comprise the process of FIG. 6.

The process of FIG. 6 may begin at step 601, where a request may be filtered based on route filters. In an embodiment where a route filter comprises a null route filter, a customer request may be recognized as a candidate for cleansing based on parameters for the request and the request may be routed to a null route. The request may be received at a router and maybe routed to a null route, such as the IP address 0.0.0.0. The null routed request may eventually be dropped because the null route is directed to a non-existent address within the network. For example, a source IP address may be flagged as a source for malicious requests and a rule may be established to null route requests from this flagged source. A request may be analyzed to determine that the source IP address has been flagged as a source for malicious requests, and the request may be routed to a null route based on this determination. For instance, a routing table stored within the router may include an entry that routes requests from the flagged source IP address to a null route. The request will not be serviced because it will be dropped based on the null route.

In an embodiment, route filters 503 may perform route filtering such that traffic is routed to an alternative route based on one or more rules. For example, a source IP address may be flagged as a source for malicious requests and a rule may be established to route requests from this flagged source to an alternative route. In this example, the alternative route may include heightened security measures. A request may be analyzed to determine that the source IP address has been flagged as a source for malicious requests, and the request may be routed to the alternative route based on this determination. In another example, an alternative route may include relaxed security, if, for example, a source for the request is a trusted source. In an embodiment, one or more rules may be generated such that a request may be routed to an alternative route or a null route based on a number of parameters, such as a source IP address, a destination IP address, and any other suitable request parameter. In an embodiment, route filters 503 of FIG. 5 may perform route filtering.

The process of FIG. 6 may proceed from step 601 to step 602, where a request may be filtered based on access control list (ACL) parameters. A customer request may be recognized as a candidate for cleansing based on parameters for the request and the request may be filtered based on access control list filters. For example, an access control list filter may flag one or more source IP addresses, where a rule is generated that states a request from the flagged source IP address is to be filtered. Accordingly, any request that includes the flagged IP source address as a parameter will be filtered. In an embodiment, ACL filters 504 of FIG. 5 may perform ACL filtering. In an embodiment, one or more rules may be generated such that access control list filters may configured to filter requests based on a number of parameters, such as a source IP address, a destination IP address, a port, specific protocol information, such as Internet Protocol (IP) information, and any other suitable request parameter.

The process of FIG. 6 may proceed from step 602 to step 603, where a request may be filtered based on layer attack parameters. A customer request may be recognized as a candidate for cleansing based on parameters for the request and the request may be filtered based on layer attack filters. In an example, filtering a customer request may comprise blocking the customer request from a destination address and/or not servicing the customer request. In an embodiment, layer attack filters 505 of FIG. 5 may perform layer attack filtering.

A cyber attack, such as a DDoS or DoS attack, may be implemented in a number of different ways. For example, a DDoS or DoS attack may comprise a layer 4 attack, a layer 7 attack, or any other suitable attack. The attack may be described as a layer attack because the attack takes place at a certain layer of a communication model, such as the Open Systems Interconnection (OSI) communication systems model. For example, a layer 4 attack may occur at a transport layer of the OSI model. The transport layer may include Transmission Control Protocol (TCP) or User Datagram Protocol (UDP) communications. As such, a requester may perform a layer 4 attack by flooding a computing device, such as a server, with SYN packets that are designed to overwhelm the computing device while it attempts to initiate a TCP connection with the requester. Layer seven of the OSI model comprises the application layer. The application layer may include application level communications, such as Hypertext Transfer Protocol (HTTP) and File Transfer Protocol (FTP) communications. As such, a requester may perform a layer 7 attack by flooding a computing device, such as a server, with HTTP requests, such as HTTP GET requests or HTTP POST requests, that are designed to overwhelm the computing device while it attempts to service the HTTP requests. DDoS or DoS attacks may also include attacks at other layers of the OSI model. A DDoS or DoS mitigation system that only protects up to layer 4 of the OSI model may accordingly miss a layer 7 attack.

In an embodiment, layer attack filters may accomplish DDoS or DoS mitigation for attacks at a plurality of layers. For example, a filter may accomplish layer 4 attack mitigation by filtering excessive SYN packets from a requester or may accomplish layer 7 attack mitigation by filtering excessive HTTP requests from a requester. In an embodiment, the layer attack filters mitigate against DDoS or DoS layer attacks using packet inspection. For example, a layer attack filter may inspect an incoming packet to determine the contents of the packet. In a first embodiment, a packet may be inspected up to the fourth layer in order to determine, for example, whether the packet includes a SYN request and to determine whether the packet part of a layer 4 attack designed to flood a computing device with SYN packets. In a second embodiment, a packet may be inspected up to the seventh layer in order to determine, for example, whether the packet includes an HTTP request and whether the packer is part of a layer 7 attack designed to flood a computing device with HTTP request. Packets may be inspected up to various layers of the OSI model in order to determine the contents of the packet. In an embodiment, deep packet inspection (DPI) may be leveraged in order to determine the contents of a packet.

In an embodiment, parameters for a request may be determined based on packet inspection and the request may be filtered based on the parameters. One or more rules may be established to filter requests based on one or more parameters. For example, a rule may be established that filters SYN requests from a particular source IP address, or a group of source IP addresses, once the number of requests, within a certain time period, is greater than a threshold. A rule may also filter SYN requests directed to a particular destination IP address if the number of requests, within a certain time period, is greater than a threshold. In another example, a rule may be established that filters HTTP requests from a particular source IP address, or a group of source IP addresses, once the number of requests, within a certain time period, is greater than a threshold. A rule may also filter HTTP requests directed to a particular destination IP address if the number of requests, within a certain time period, is greater than a threshold. In an embodiment, rules may be established based on trends for cyber attacks, such as DDoS or DoS attacks. In another embodiment, rules also may be established based on a visualization tools that displays a plurality of customer requests received at one or more cleansing farms, as later described.

In an embodiment, a request may include confidential customer information. For example, the request may be destined for an organization that comprises a financial institution, such as a bank, and the request may include confidential information. A request from a banking customer to a banking institution may include confidential information, such as a social security number, a bank account number, a debit card number, a credit card number, and the like. In an embodiment, a customer request may include information that is confidential to the customer, such as a social security number, or information that is confidential between the bank and the customer, such as a bank account number.

In an embodiment, packet inspection and deep packet inspection may be leveraged at one or more cleansing farms to inspect customer requests in order to mitigate against cyber attacks, as described above. In an example, a customer request directed to a financial institution, such as a bank, may include confidential customer information or confidential information between the financial institution and the customer. Accordingly, customer requests directed to a financial institution that are routed to a cleansing farm for packet inspection may include confidential customer information that may be inspected during packet inspection.

In an embodiment, layer attack filters 505 of FIG. 5 may inspect a customer request that includes confidential information. For example, a layer attack filter may inspect a customer request that includes information that is confidential to the customer, such as a social security number, or information that is confidential to an organization and the customer, such as a bank account number. In an embodiment, the inspection of the customer request may comprise packet inspection or deep packet inspection. In another embodiment, the inspection of the customer request may comprise an inspection of one or more, including all, of the layers of the OSI communication model. For example, confidential customer information may reside in a seventh layer, or the application layer, of the customer request and a layer attack filter may inspect the customer request up to the seventh layer and gain access to the confidential customer information.

In an embodiment, a cleansing farm may be administered by an entity that is authorized to view confidential customer information. For example, a layer attack filter 505 of FIG. 5 may include a rule that filters HTTP GET requests destined for a particular address. In this example, a plurality of customer requests may be received, and the requests may be inspected up to the seventh layer, or the application layer, in order to determine whether the requests should be filtered, that is determine whether the requests comprises an HTTP GET request destined for the particular destination.

In an embodiment, one of the received customer requests includes confidential customer information, for example, within the seventh layer of the request. When the cleansing farm inspects a request up to the seventh layer where the request includes confidential customer information in the seventh layer, the confidential customer information is accessed by the cleansing farm. For example, if the confidential customer information is encrypted, the information is decrypted so that the cleansing farm may inspect the decrypted content. Based on the inspecting the seventh layer, including the confidential customer information, one or more parameters may be determined for the request. The one or more parameters may include a social security number for a customer, an address for a customer, a bank account number for a customer, a debit card number for a customer, or any other suitable confidential information.

In an embodiment, the parameters may be compared to the rules of the cleansing farm filters, for example, route filters 503, ACL filters 504, or attack layer filters 505. Based on the results of this comparison, the request may be filtered or routed. For example, a rule may indicate that a customer request that comprises an invalid social security number may be filtered. In addition, for an organization such as a bank, a rule may indicate that a customer request that comprises a social security number that does not match a bank customer may be filtered. A rule may also indicate that a customer request that comprises an address that does not match a bank customer may be filtered. Another rule may indicate that a customer request that comprises a bank account number that is invalid or that does not match a bank customer may be filtered. A rule may also indicate that a customer request that comprises a debit card number that is invalid or that does not match a bank customer may be filtered. In an embodiment, an administrator of the cleansing farm would need to have authorization to access confidential customer information in order to perform the packet inspection and filtering described above. For example, in order for the cleansing farm to inspect a plurality of packets up to a seventh layer, where one of the packets includes confidential customer information, and determine parameters based on the inspection, an administrator of the cleansing farm would need to have authorization to access the confidential customer information.

In an embodiment, an administrator of one or more cleansing farms may comprise an entity that is permitted to access the confidential customer information, such as the financial institution itself. For example, the cleansing farm may be run by a part of the financial institution. In another embodiment, a user of a visualization tool, as explained below, may comprise a user that is permitted to access confidential customer information, such as a financial institution employee.

In an embodiment, a cleansing farm may include or have access to one or more keys for an organization. For example, if an organization is a bank organization, a cleansing farm may have access to a cryptographic key, such as a private key, for the bank. In an embodiment, packet inspection at the cleansing farm may comprise using a key for the organization to decrypt a packet. For example, a socket secure layer (SSL) protocol may be leveraged to communicate with the bank, and the cleaning farm may decrypt customer requests using the key for the bank in order to inspect the requests. Accordingly, filters, as described above, may be applied to customer requests that leverage encryption schemes, such as SSL or any other suitable scheme.

The process of FIG. 6 may proceed from step 603 to step 604, where a request may be routed to a destination. Step 604 may comprise of step 404 of FIG. 4. Accordingly, a request may be routed to Content Delivery Network (CDN) 506, Domain Name System (DNS) 507, or network 508, which may comprise an intranet or any other suitable network.

Figure 7:
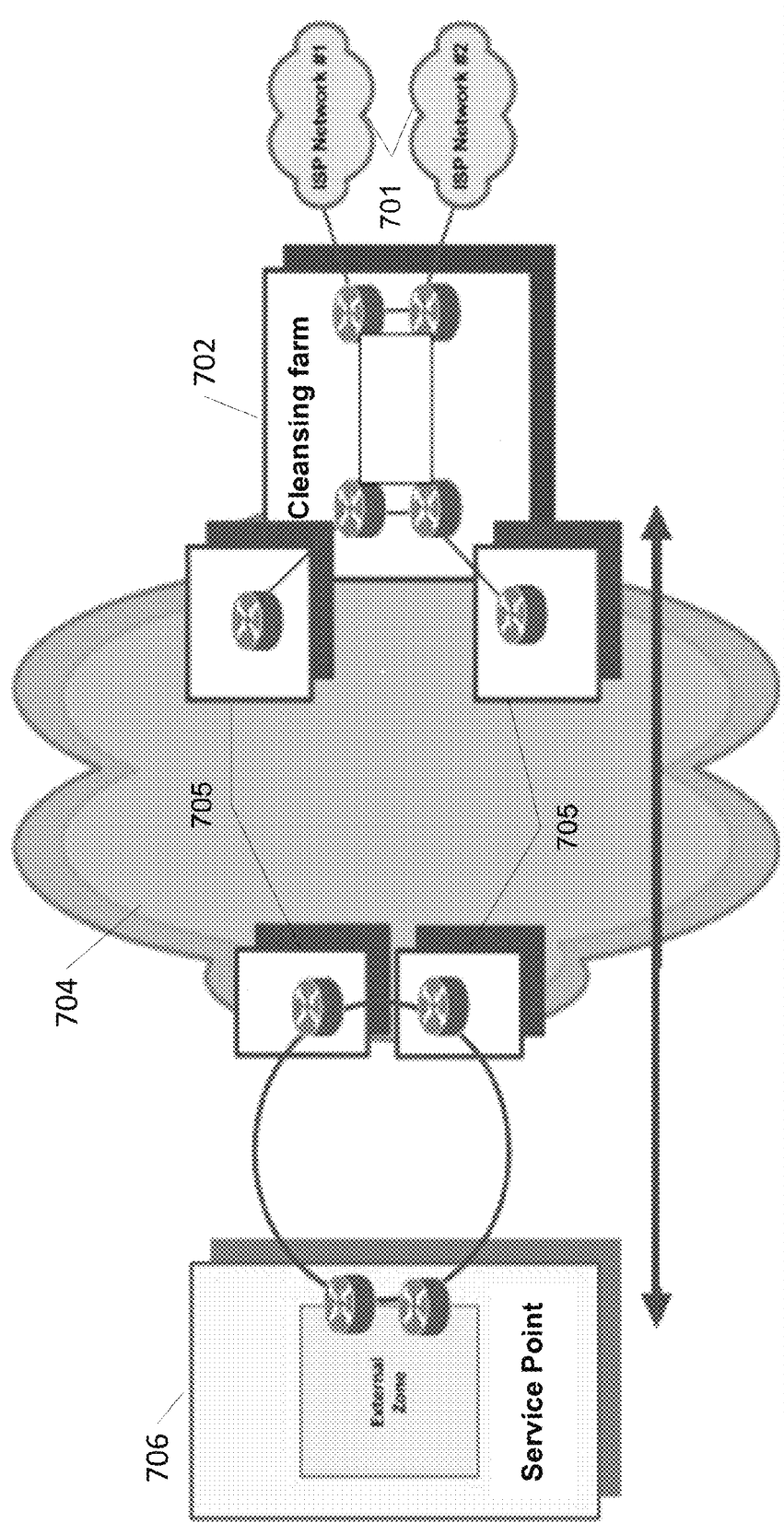
FIG. 7 illustrates an example framework for routing a cleansed request to a destination according to an embodiment.

In an embodiment, a cleansed request may be routed to a destination based on a network backbone. FIG. 7 illustrates an example framework for routing a cleansed request to a destination according to an embodiment. FIG. 7 includes Internet Service Providers (ISPs) 701, cleansing farm 702, cloud service 704, routers 705, and service point 706. Cloud service 704 may include routers 705 that comprise a network backbone. Routers 705 may connect cleansing farm 702 with service point 706.

In an embodiment, a customer request for an organization may be received at cleansing farm 702 from one of ISPs 701. The customer request may be cleansed by the cleansing farm 702 and the cleansed customer request may be routed within cloud service 704 along routers 705 to a destination, such as service point 706. Routers 705 may comprise a time division multiplexing (TDM) network, dense wavelength division multiplexing (DWDM) network, or any other suitable network. In an embodiment, service point 705 may gain access to the Internet via cloud service 705. For example, Internet traffic to a from service point 705, such as traffic between service point 705 and ISPs 701, may be routed along routers 705.

In an embodiment, cloud service 202 of FIG. 2 may include a network backbone comprised of routers such as routers 705. For example, data centers 203 may be connected to Internet 201 by a network backbone of routers such as routers 705. Accordingly, a customer request for an organization may be received at cloud service 202 from Internet 201. The customer request may be cleansed by a cleansing farm deployed within cloud service 202 and the cleansed customer request may be routed along a backbone of routers to one or more service points 203.

In an embodiment, cloud service 303 of FIG. 3 may include a network backbone comprised of routers such as routers 705. For example, data cleansing farms 302 and data centers 304 may be connected by a network backbone of routers such as routers 705. Accordingly, a customer request for an organization may be received at one of cleansing farms 302 from Internet 301. The customer request may be cleansed by the cleansing farm 302 and the cleansed customer request may be routed within cloud service 303 along a backbone of routers to one or more service points 304.

In an embodiment, the steps of FIG. 6 may be performed in an automated manner. For example, a cleansing farm, such as cleansing farm 502, may perform filtering, as described above, in an automated process. A cleansed request may then be routed to a destination, as described below with reference to FIG. 7, in an automated process. In another embodiment, some steps performed by a cleansing farm may include manual assistance. For example, determining whether to filter or route one or more requests may include manual assistance. In addition, a visualization tool, as described below, may be leveraged.

In an embodiment, a visualization tool may display a visualization of customer requests received at one or more cleansing farms. For example, the tool may display a visualization for customer requests received at cleansing farms 302. In an embodiment, the tool may display a visualization of customer requests received at each cleansing farm individually or may further display a visualization of an aggregate of customer requests received at all of the cleansing farms. The visualization tool may display the information to a user that interfaces with the visualization tool. The visualization tool may comprise a stand-alone application or an applet on a website. A stand-alone application may leverage a number of technologies (e.g., Java, C++, and the like) and a website may leverage a number of web technologies (e.g., HTML, CSS, Java-script, AJAX, J2EE, .NET, and the like) in order to implement an embodiment.

In an embodiment, a visualization may comprise displaying information about customer requests, such as the number of requests, the type of requests, an IP source address, an IP destination address, port information, and any other suitable information. The request information may comprise information determined about the requests using packet inspection, or deep packet inspection, or parameters for customer requests, as described earlier. For example, a visualization may display that one or more of cleansing farms 302 is receiving a plurality of requests from one or more source IP addresses that comprise TCP SYN requests for a particular destination IP address. In this example, these customer requests are grouped according to the type of request and the destination IP address and the customer requests are display according to the group. In an embodiment, the information may be displayed along with an indicator, such as using a different colored text, if the number of TCP SYN requests is above a threshold. The threshold for SYN requests may be configured based on an estimation for the number of SYN requests estimated to overload a computing device, such as a server.

In another example, a visualization may display that one or more of cleansing farms 302 is receiving a plurality of requests from one or more source IP addresses that comprise HTTP requests for a particular destination IP address. In this example, these customer requests are grouped according to the type of request and the destination IP address and the customer requests are display according to the group. In an embodiment, the information may be displayed along with an indicator, such as using a different colored text, if the number of HTTP requests is above a threshold. The threshold for HTTP requests may be configured based on an estimation for the number of HTTP requests estimated to overload a computing device, such as a server.

In an embodiment, a rule may be generated at the visualization tool. For example, a rule that configures the route filters 503, ACL filters 504, and/or layer attack filters 505 of FIG. 5 may be generated at the visualization tool based on the displayed request traffic for one or more cleansing farms. For instance, if a number of SYN requests reaches a threshold amount such that and indicator is displayed along with the information for the SYN requests, the visualization tool may be configured to generate a rule to filter such requests. In an embodiment, the visualization tool may generate a user interface element, such as a button, that may generate the rule. For example, where the number of SYN requests is greater than a threshold such that an indicator is displayed along with the request information, the visualization tool may also generate a user interface element, such as a button, along with the request information, where the button is configured to generate a rule filtering the SYN requests when clicked. Accordingly, clicking the button will configure one or more filters, such as layer attack filters 505, to filter customer requests with particular parameters.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computer implemented method, comprising:
receiving, at a cleansing farm, a plurality of customer requests from a network wherein at least one of the customer requests includes an application layer comprising confidential customer information;
inspecting a plurality of layers of the customer requests that include confidential customer information by inspecting the application layer and at least one other layer to assess the confidential customer information;

determining one or more parameters associated with the customer requests based on the inspecting, wherein the one or more parameters are at least partially based on the inspection of the application layer comprising the confidential customer information;

comparing the parameters associated with the customer requests to one or more filtering rules, wherein the filtering rules comprise rules to mitigate against a cyber attack;

determining whether the customer requests should be filtered based on the comparison;

filtering a first part of the customer requests when it is determined that the first part of the customer requests should be filtered, wherein filtering the first part of the customer request comprises routing a customer request associated with a flagged message source to a non-existent address; and routing a second part of the customer requests to a destination within an internal network when it is determined that the second part of the customer requests should not be filtered.

2. A method of claim 1,
wherein the customer requests are directed to a financial institution, and
wherein the cleansing farm is administered by the financial institution.

3. A method of claim 2, wherein the confidential customer information comprises at least one of a social security number, a bank account number, a debit card number, and an address.

4. A method of claim 1, wherein the cleansing farm is administered by an entity that is permitted to access the confidential customer information.

5. A method of claim 1, wherein the one or more parameters for the customer request that includes confidential customer information comprises at least one of a social security number, a bank account number, a debit card number, and an address.

6. A method of claim 1, wherein the filtering rules comprise a rule that mitigates against an application layer denial of service attack.

7. A method of claim 1, further comprising:
displaying, at a visualization tool, a visualization of the plurality customer requests received at the cleansing farm, wherein the visualization includes at least a portion of the parameters for the customer requests.

8. A method of claim 7,
wherein the displayed customer requests are grouped based on one or more of the parameters for the customer requests, and
wherein an indication is displayed along with a group of customer requests when a number of customer requests within the group exceeds a threshold.

9. A method of claim 7, further comprising:
receiving, at the visualization tool, a filtering rule for filtering customer requests at the cleansing farm.

10. A method of claim 7, wherein the visualization tools is configured to display a visualization of an aggregation of a plurality customer requests received at a plurality of cleansing farms.

11. A system comprising:
a cleansing farm comprising a computer with a processor is configured to:
receive a plurality of customer requests from a network wherein one of the customer requests includes an application layer comprising confidential customer information;

inspect a plurality of layers of the customer requests, wherein inspecting the customer request that includes confidential customer information further comprises inspecting the application layer and at least one other layer of the customer request such that the confidential customer information is accessed;

determine one or more parameters for the customer requests based on the inspecting, wherein the one or more parameters determined for the customer request that includes confidential customer information are at least partially based on the inspection of the application layer comprising the confidential customer information;

compare the parameters for the customer requests to one or more filtering rules, wherein the filtering rules comprise rules to mitigate against a cyber attack;

determine whether the customer requests should be filtered based on the comparison;

filter a first part of the customer requests when it is determined that the first part of the customer requests should be filtered; and route a second part of the customer requests to a destination within an internal network when it is determined that the second part of the customer requests should not be filtered.

12. A system of claim 11,
wherein the customer requests are directed to a financial institution, and
wherein the cleansing farm is administered by the financial institution.

13. A system of claim 12, wherein the confidential customer information comprises at least one of a social security number, a bank account number, a debit card number, and an address.

14. A system of claim 11, wherein the cleansing farm is administered by an entity that is permitted to access the confidential customer information.

15. A system of claim 11, wherein the one or more parameters for the customer request that includes confidential customer information comprises at least one of a social security number, a bank account number, a debit card number, and an address.

16. A system of claim 15, wherein the filtering rules comprise a rule that mitigates against an application layer denial of service attack.

17. A system of claim 1, further comprising:
a visualization tool configured to:
display a visualization of a plurality customer requests received at the cleansing farm, wherein the visualization includes at least a portion of the parameters for the customer requests.

18. A system of claim 17,
wherein the displayed customer requests are grouped based on one or more of the parameters for the customer requests, and
wherein an indication is displayed along with a group of customer requests when a number of customer requests within the group exceeds a threshold.

19. A system of claim 7, wherein the visualization tool is further configured to:
receive a filtering rule for filtering customer requests at the cleansing farm.

20. One or more non-transitory computer readable media having stored thereon instructions that, when executed by an apparatus, cause the apparatus to:

receive a plurality of customer requests from a network wherein one of the customer requests includes an application layer comprising confidential customer information;

inspect a plurality of layers of the customer requests, wherein the inspecting of the plurality of layers of the customer requests that include confidential customer information further comprises inspecting at least the application layer of the customer request such that the confidential customer information is accessed;

determine one or more parameters for the customer requests based on the inspecting, wherein the one or more parameters determined for the customer request that includes confidential customer information are at least partially based on the inspection of the application layer comprising the confidential customer information;

compare the parameters for the customer requests to one or more filtering rules, wherein the filtering rules comprise rules to mitigate against a cyber attack;

determine whether the customer requests should be filtered based on the comparison;

filter a first part of the customer requests when it is determined that the first part of the customer requests should be filtered, wherein filtering the first part of the customer request comprises routing the requests to a non-existent address; and route a second part of the customer requests to a destination within an internal network when it is determined that the second part of the customer requests should not be filtered.

* * * * *